United States Patent [19]

Sasame et al.

[11] 3,890,070
[45] June 17, 1975

[54] RELATIVE COMBINATION OF AN APEX SEAL AND A ROTOR HOUSING IN THE ROTARY ENGINE

[75] Inventors: Takao Sasame, Hiroshima; Kentaro Takahashi, Saitama; Yoshikatsu Nakamura, Kanagawa; Kazumasa Miura, Saitama, all of Japan

[73] Assignee: Nippon Piston Ring Co., Ltd., Tokyo, Japan

[22] Filed: Aug. 3, 1973

[21] Appl. No.: 385,266

[30] Foreign Application Priority Data
Aug. 3, 1972  Japan.................................. 47-77286

[52] U.S. Cl........... 418/178; 117/93.1 PF; 277/235 A
[51] Int. Cl. ............................................ F01c 21/08
[58] Field of Search ........ 117/93.1 PF, 93.1 R, 105, 117/105.1, 105.2; 29/195 M; 148/31.5; 277/235 A; 308/DIG. 8; 418/178, 179

[56] References Cited
UNITED STATES PATENTS

| | | |
|---|---|---|
| 2,311,240 | 2/1943 | Marien et al. .................. 277/235 A |
| 3,061,525 | 10/1962 | Grazen............................. 29/195 M |
| 3,155,311 | 11/1964 | Jones.................................... 418/178 |
| 3,155,313 | 11/1964 | Bentele.............................. 418/179 |
| 3,394,877 | 7/1968 | Hantzsche et al. ................. 418/178 |
| 3,731,941 | 5/1973 | Mori et al........................... 418/179 |

FOREIGN PATENTS OR APPLICATIONS
1,003,118  9/1965  United Kingdom.......... 117/93.1 PF Primary Examiner—C. J. Husar
Assistant Examiner—O. T. Sessions
Attorney, Agent, or Firm—Sughrue, Rothwell, Mion, Zinn and Macpeak

[57] ABSTRACT

A layer of Fe-O compound having the thickness of more than 0.1 mm is formed on a sliding surface of an apex seal made from a ferrous or nonferrous metal by the spraying treatment. The oxygen content in the Fe-O compound is ranging from 15.0 wt.% to 30.05 wt.%. A hard layer having the Hv hardness of more than 650 is formed on the sliding surface of the rotor housing.

Both said apex seal and rotor housing are combined with each other, intending to improve the wear and scuffing resistances of the sliding surface.

1 Claim, 2 Drawing Figures

RELATIVE COMBINATION OF AN APEX SEAL AND A ROTOR HOUSING IN THE ROTARY ENGINE

BACKGROUND OF THE INVENTION

This invention relates to a relative combination of an apex seal and a rotor housing in the rotary engine.

SUMMARY OF THE INVENTION

An object of this invention is to increase the durability of the rotary engine by imparting thereto the high wear and scuffing resistances.

Another object of this invention is to solve problems on the "chatter mark" which is considered to be resulted partly from a discontinuity of the lubrication between the apex seal and the rotor housing.

According to this invention, an apex seal made from a ferrous or nonferrous metal and having the sprayed layer of a Fe-O compound on the sliding surface which contains 15.0 – 30.05 wt.% of oxygen and has the thickness of more than 0.1 mm is combined with a rotor housing having a hard layer of more than Hv 650 on the sliding surface. Hv hardness stands for Vickers hardness.

The amount of oxygen in the Fe-O compound is closely connected with the self-lubrication of the apex seal, and accordingly restricted to the above described range of 15.0 – 30.05 wt.%.

The thickness of the sprayed layer must be at least 0.1 mm. If the thickness of the sprayed layer is not more than 0.1 mm, the desired service life of the apex seal will not be expected. The upper limit of the thickness of the sprayed layer is determined by the results of experiments and the economical reason, and preferably 5 mm or less.

The hard layer to be formed on the sliding surface of the rotor housing may be a hard Cr plated layer, or a Ni plated layer containing silicon carbide or the like hard particles, and the Hv hardness of the hard layer must be more than 650 as taking the wear resistance into consideration.

FIG. 1 is an enlarged photograph showing a microstructure of the sprayed layer of the Fe-O compound in the apex seal, wherein the white zones indicate the sprayed layer of the Fe-O compound containing oxygen and the black zones indicate voids in the sprayed layer formed during the spraying treatment.

Such structure of the sprayed layer exhibits the excellent wear resistance and scuffing resistance due to the self lubricating property of the Fe-O compound. Besides, the voids in the sprayed layer causes the porous and oil impregnating structure. As the Fe-O compound is readily converted into drops during the spraying treatment due to the relatively low melting point (about 1500°C), the sprayed particles are mutually entangled to increase the strength of the sprayed layer itself. Accordingly, the acceleration of the abrasion of the apex seal and the rotor housing by the peeled off particles is never caused.

Where the sliding surface of the rotor housing is hard, the combination of the above said apex seal and the rotor housing brings out unexpectedly high wear resistance therebetween, and reduces the forming of the scuffing due to the self lubricating property and the oil impregnating property of the sliding surface of the apex seal even if the discontinuity of the lubrication exists between the apex seal and the rotor housing, thus resulting in the prevention of the chatter mark.

PREFERRED EMBODIMENTS OF THIS INVENTION

Figure 1:
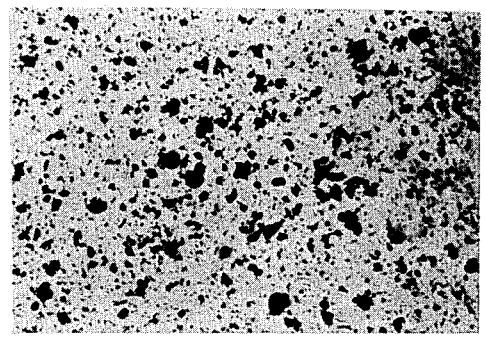
FIG. 1 is an enlarged photograph showing a microstructure (magnitude 100) of a sprayed layer of Fe-O compound formed on the sliding surface of the apex seal.

Now, some examples of this invention will be described with reference to the drawings.

EXAMPLE 1

A Fe-O compound containing 27.6 wt.% of oxygen was plasmasprayed on a sliding surface of an apex seal made from the cast iron (JIS FC–25) to form the layer of 1 mm thickness. The Hv (30) hardness of the resultant sprayed layer was 700.

The spraying conditions were as follows:
spraying gun; Meteco 3M type plasma spraying gun
$N_2$ gas pressure; 50 lb/in$^2$.
$N_2$ gas flow rate; 150 ft$^3$/hr.
$H_2$ gas pressure; 50 lb/in$^2$.
$H_2$ gas flow rate; 10 ft$^3$/hr.
electric current applied; 500 A
spraying distance; 4 inch.

On the other hand, the hard Cr plating was applied to a sliding surface of a rotor housing made from Al to form the layer of 0.15 mm. The Hv hardness of the hard Cr layer was 950. The conditions for the hard Cr plating treatment were as follows:
current density; 60 A/dm$^2$
bath temperature; 60°C
bath composition; chromate anhydride 250 g/liter and sulfuric acid 2.5 g/liter The apex seal and the rotor housing thus treated were combined with each other, and the combination was subjected to the wear resistance test in the actual engine.
specification of the engine used;

| | |
|---|---|
| 1. type; | water cooled 2 rotor type Rotary Piston Internal Combustion Engine |
| 2. total exhaust volume; | 982 cc |
| 3. maximum output; | 100 PS/7000 r.p.m. |
| 4. maximum torque | 13.5 kg-m/3500 r.p.m. |
| test conditions; | |
| 1. rotating number; | 2680 r.p.m. |
| 2. boosting pressure; | –350 mm.Hg |
| 3. running time; | 50 hr. |

In order to compare the properties of the combination of the apex seal and the rotor housing according to this invention with that of the conventional combination, the same wear resistance test as described above was subjected to the combination of the same rotor housing in the Example 1 and an apex seal made from a cast iron composed of total C 3.6%, Si 2.8%, Mn 0.7%, Ni 0.7%, Cr 0.6%, Mo 1.1%, Cu 1.0% and V 0.2% and having the HRB hardness as determined by the Rockwell B scale of 110, under the same testing conditions in the Example 1.

Figure 2:
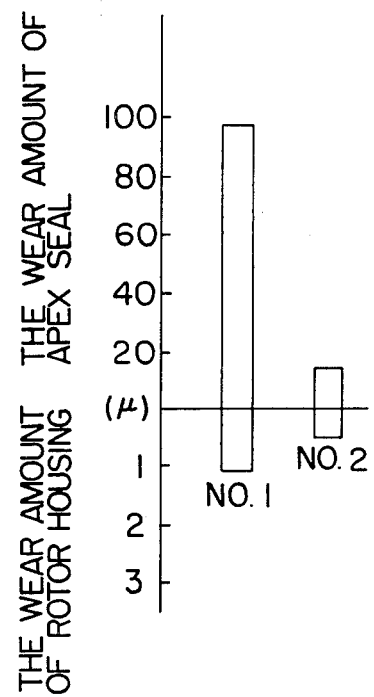
FIG. 2 is a graph showing the wear resistance of the sliding surface for the conventional combination of the apex seal and the rotor housing and that for the combination according to this invention.

The test results are shown in the FIG. 2, wherein No. 2 is the test result for the combination according to this invention and No.1 is that for the conventional combination.

It will be apparent from the FIG. 2 that the wear amount of apex seal No.2 is only about 1/7 of that of the apex seal No.1, and the wear amount of rotor housing No.2 is only about 1/5 of that of rotor housing No.1 accordingly this invention has the excellent durability.

The chatter mark is not observed in the combination according to this invention.

Then, the scuffing resistance test was carried out using the rotary wear resistance tester. A specimen having the sprayed surface layer was thrusted on a turn table which was rotated supplying the lubricating oil between the surface layer of the specimen and the upper surface of the turn table. The load to thrust the specimen on the turn table was gradually increased at every one hour to detect the limit load to cause the scuffing.

testing conditions:
1. test specimen No.1;
   obtained by plasm-spraying Fe-O compound containing oxygen 27.6% on the surface of a cast iron (JIS FC–25) to have the thickness of 1 mm and the Hv (30) hardness of 700.
2. test specimen No.2;
   composed of total C 3.6%, Si 2.8%, Mn 0.7%, Ni 0.7%, Cr 0.6%, Mo 1.1%, Cu 1.0% and V 0.2%, and having the HRB hardness of 110.
3. turn table;
   made from the cast iron (JIS FC–25) and the hard Cr plating is applied on the surface to have the Hv hardness of 950.
4. temperature of the lubricating oil; 80°C.
5. rate of feeding the lubricating oil; 0.6 1/hr.
6. lubricating oil;
   Daphni oil number 65 50% and lamp oil 50%.
7. running time;
   every 1 hr. for the load 50 kg/cm$^2$, 100 kg/cm$^2$ and 150 kg/cm$^2$ and 200 kg/cm$^2$.

The No.1 specimen was observed to cause the scuffing by the load of 200 kg/cm$^2$, whereas the No.2 specimen caused the scuffing at the load of only 50 kg/cm$^2$. It will be understood from this test result that the sprayed layer of this invention exhibits the high resistance to the scuffing under the high compression.

The base metal of the apex seal is not restricted to the cast iron, but may be Al, Cu or the like nonferrous metals.

While this invention has been described with reference to particular embodiments thereof, it will be understood that the numerous modifications may be made by those skilled in the art without actually departing from the scope of the invention.

Therefore, the appended claim is intended to cover all such equivalent variations as coming within the true spirit and scope of the invention.

What is claimed is:

1. A combination of an apex seal and a rotor housing in a rotary engine, wherein said apex seal is made from ferrous or nonferrous metal and having more than 0.1 mm of the sliding surface layer thereof formed by spraying Fe-O compound containing oxygen 15.0 – 30.05 weight %, and said rotor housing has a hard plated sliding surface having the Hv hardness of more than 650.

* * * * *